United States Patent
Chen et al.

(10) Patent No.: US 10,038,385 B2
(45) Date of Patent: Jul. 31, 2018

(54) FLYBACK CONVERTER AND CONTROLLER USING COUNTER AND CURRENT EMULATOR

(71) Applicant: FAIRCHILD SEMICONDUCTOR CORPORATION, Sunnyvale, CA (US)

(72) Inventors: Lei Chen, Milpitas, CA (US); Chih-Hsien Hsieh, Changhua County (TW); Yue-Hong Tang, Nantou County (TW)

(73) Assignee: FAIRCHILD SEMICONDUCTOR CORPORATION, Phoenix, AZ (US)

( * ) Notice: Subject to any disclaimer, the term of this patent is extended or adjusted under 35 U.S.C. 154(b) by 0 days.

(21) Appl. No.: 15/471,666

(22) Filed: Mar. 28, 2017

(65) Prior Publication Data

US 2017/0302184 A1     Oct. 19, 2017

Related U.S. Application Data

(60) Provisional application No. 62/324,520, filed on Apr. 19, 2016.

(51) Int. Cl.
    *H02M 3/335*     (2006.01)
    *H02M 1/08*     (2006.01)
    *H02M 1/00*     (2006.01)

(52) U.S. Cl.
    CPC ........ *H02M 3/33515* (2013.01); *H02M 1/08* (2013.01); *H02M 3/33523* (2013.01); *H02M 2001/0009* (2013.01)

(58) Field of Classification Search
    CPC .......... H02M 2001/0009; H02M 3/335–3/338
    See application file for complete search history.

(56) References Cited

U.S. PATENT DOCUMENTS

| | | | |
|---|---|---|---|
| 6,198,638 B1* | 3/2001 | Lee | H02M 1/38 363/21.14 |
| 7,986,536 B2* | 7/2011 | Lhermite | H02M 3/33507 363/21.12 |
| 2010/0195355 A1* | 8/2010 | Zheng | H02M 3/33507 363/21.12 |
| 2016/0020699 A1* | 1/2016 | Shen | H02M 1/44 363/15 |

* cited by examiner

*Primary Examiner* — Gary L Laxton
*Assistant Examiner* — Peter Novak
(74) *Attorney, Agent, or Firm* — Robert F. Hightower

(57) ABSTRACT

In one embodiment, a power supply controller, or alternately a semiconductor device having a power supply controller, may have a circuit configured configuring the PWM circuit to form a first signal having a value formed to be representative of a peak value of a primary current through the power switch and having a duration that is representative of a time interval that a secondary current is flowing through a secondary winding wherein the peak value is the peak value during an on-time of the power switch, and configured to form a current having a value that is representative of an average value of the secondary current.

18 Claims, 5 Drawing Sheets

FLYBACK CONVERTER AND CONTROLLER USING COUNTER AND CURRENT EMULATOR

PRIORITY CLAIM TO PRIOR PROVISIONAL FILING

This application claims priority to prior filed Provisional Application No. 62/324,520 entitled "A METHOD FOR ESTIMATING OUTPUT POWER IN A SWITCHING REGULATOR" filed on Apr. 19, 2016, and having common inventors Lei Chen et al. which is hereby incorporated herein by reference

BACKGROUND OF THE INVENTION

The present invention relates, in general, to electronics, and more particularly, to semiconductors, structures thereof, and methods of forming semiconductor devices.

In the past, the electronics industry utilized various methods and structures to form power supply systems used to regulate an output voltage to a desired value. In some applications, the power supply included a transformer with a primary and secondary side. The system may have utilized a primary side controller on the primary side of the transformer and may have also included a synchronous rectifier (SR) on the secondary side in order to improve efficiency.

In some applications it may have been important to be able to estimate the power delivered to the load from the secondary winding. Otherwise, the primary side may have been incorrectly controlled which could result in improper regulation of the output voltage.

Accordingly, it is desirable to have a power supply control circuit that improves regulation of the output voltage, and/or that improves the estimation of the output power.

Figure 1:
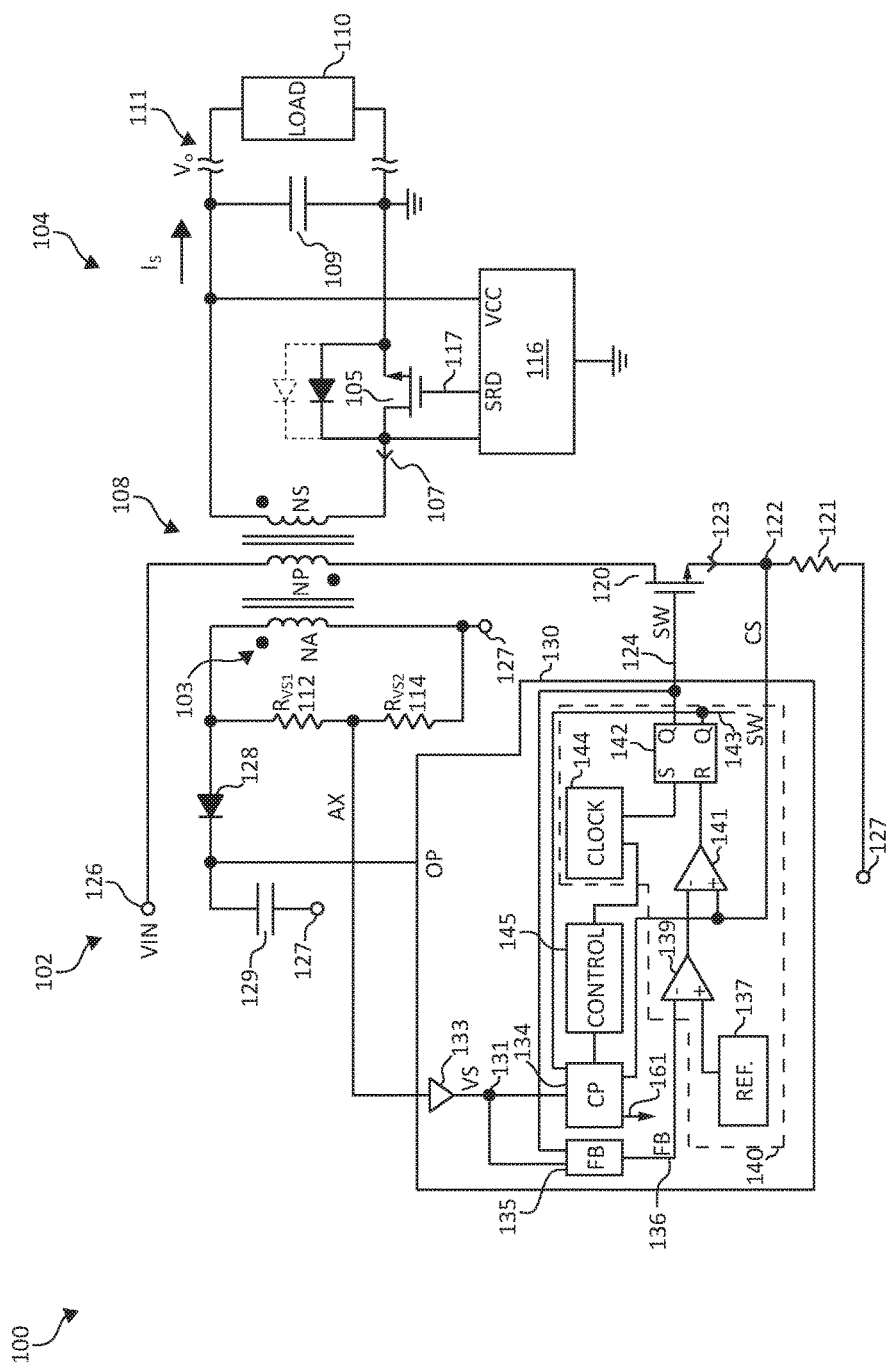
FIG. 1 schematically illustrates an example of an embodiment of a portion of a power supply system in accordance with the present invention.

For simplicity and clarity of the illustration(s), elements in the figures are not necessarily to scale, some of the elements may be exaggerated for illustrative purposes, and the same reference numbers in different figures denote the same elements, unless stated otherwise. Additionally, descriptions and details of well-known steps and elements may be omitted for simplicity of the description. As used herein current carrying element or current carrying electrode means an element of a device that carries current through the device such as a source or a drain of an MOS transistor or an emitter or a collector of a bipolar transistor or a cathode or anode of a diode, and a control element or control electrode means an element of the device that controls current through the device such as a gate of an MOS transistor or a base of a bipolar transistor. Additionally, one current carrying element may carry current in one direction through a device, such as carry current entering the device, and a second current carrying element may carry current in an opposite direction through the device, such as carry current leaving the device. Although the devices may be explained herein as certain N-channel or P-channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for some elements including semiconductor doping concentrations) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Except as otherwise noted herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. Reference to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but in some cases it may. Furthermore, the particular features, structures or characteristics may be combined in any suitable manner, as would be apparent to one of ordinary skill in the art, in one or more embodiments.

The embodiments illustrated and described hereinafter suitably may have embodiments and/or may be practiced in the absence of any element which is not specifically disclosed herein.

DETAILED DESCRIPTION OF THE DRAWINGS

FIG. 1 schematically illustrates a portion of an example of an embodiment of a power supply system 100 that regulates an output voltage (Vo) to a desired value. System 100 includes a transformer 108 that has a primary winding (NP), a secondary winding (NS), and an auxiliary winding (NA) 103. A primary side 102 of system 100 is connected to the primary winding of transformer 108. A secondary side 104 of system 100 is configured to form a secondary current (Is) that is supplied by the secondary winding (NS) in order to form the output voltage (Vo). Secondary side 104 may have an embodiment that may include a synchronous rectifier (illustrated as a transistor 105), an output capacitor 109, and a synchronous rectifier control circuit or controller 116. Some embodiments of transistor 105 may include a body diode 106. Other embodiments may use a diode instead of transistor 105 as the synchronous rectifier. In an embodiment, circuit 116 may be configured to control transistor 105 in response to signals received from secondary side 104. In other embodiments, circuit 116 may also receive signals from primary side 102.

Primary side 102 receives an input voltage (Vin) between a voltage input 126 and a common return terminal 127. A primary side power switch, illustrated as a transistor 120, may be connected to the primary winding in order to control a primary side current 123 that flows through the primary winding and transistor 120. An optional current sense circuit, illustrated as a resistor 121, may be configured to form a current sense (CS) signal 122 that is representative of the value of current 123. Those skilled in the art will appreciate that the current sense circuit may have other embodiments such as for example a sense transistor or other element that forms a current sense signal that is representative of current 123. For example, transistor 120 may be a SENSEFET transistor that forms a signal representative of current 123. A power supply control circuit 130 may be configured to form a switching drive (SW) signal 124 to control transistor 120. In some embodiments, transistor 120 may be included within a portion of circuit 130.

An embodiment of a SenseFET type of transistor may be formed to include a main transistor portion and a sensing portion. The SenseFET type of transistor may have an embodiment that may be formed of many transistor cells that are interconnected to form a larger transistor that can have a large load current with a low on-resistance. A few of the cells have their sources separated from the sources of the remaining cells and are brought to a separate external terminal or sense terminal, such as a sense terminal 39 of transistor 32. The remainder of the sources are connected together to form a source, such as a source 40 of transistor 32. The drains and gates of all the cells generally are common to form the respective drain and gate. One example of an embodiment of a SENSEFET type of transistor is disclosed in U.S. Pat. No. 4,553,084 issued to Robert Wrathall on Nov. 12, 1985, which is hereby incorporated herein by reference.

In some embodiments, load 110 may be a distance away from capacitor 109 or from the secondary winding (NS) as indicated in a general manner by a discontinuity 111. The longer distance of interconnect may have a resistance that may result in a voltage loss across the distance of the interconnect. The output voltage (Vo) may have to be higher to compensate for the lost voltage. Thus, it may be desirable for the primary side controller to have an estimate of the current (Is) supplied by the secondary winding. Since system 100 does not send signals from secondary side 104 back to primary side 102, for example does not use an optical coupler or other device to send signals to side 102, it may be desirable for the primary side controller to estimate the current supplied by the secondary winding.

In an embodiment, auxiliary winding 103 may be utilized to form an operating voltage for operating circuitry on primary side 102. For example, a diode 128 and a capacitor 129 may be connected to the auxiliary winding to form an operating voltage (Vcc) for operating circuit 130. Auxiliary winding 103 may also be used to form an auxiliary (AX) signal that may be used by circuit 130. In some embodiments an optional resistor divider, such as for example resistors 112 and 114, or other circuitry may be utilized to reduce the value of the AX signal formed by auxiliary winding 103 to a value that can be used by circuit 130.

As will be seen further hereinafter, an embodiment of circuit 130 may be configured to receive the auxiliary (AX) signal and form a voltage sample (VS) signal 131 that is representative of the timing of the secondary current (Is). As will be seen further hereinafter, the VS signal may be used to assist in estimating the current supplied by the secondary winding. An embodiment may include that circuit 130 may be configured to also use signal 131 to form a feedback (FB) signal that is representative of the output voltage (Vo). Some embodiments of circuit 130 may be configured to use the feedback (FB) signal to assist in controlling the power switch and current 123 in order to regulate the value of the output voltage (Vo) to a desired value. Those skilled in the art will appreciate that the output voltage is regulated to the desired value within a range of values around the desired value. For example, the desired value may be five volts (5v) and the range of values may be plus or minus five percent (5%) around the five volts.

Circuit 130 may include an optional buffer circuit 133 or other type of circuit that receives the auxiliary (AX) signal and forms a sense signal 131. An embodiment of a current predicting circuit 134 may be configured to receive the VS signal and the CS signal and form an estimated current (IE) signal 161 that is representative of the average value of the current supplied to secondary side 104 by the secondary winding. For example, an embodiment may include that circuit 134 may be configured to form signal 161 to be representative of the average value of the current supplied during a period of signal 124. A feedback (FB) circuit 135 of circuit 130 may be configured to receive signal 131 and form a feedback (FB) signal 136 that represents the value of the output voltage (Vo). A switching control circuit 140, such as for example a PWM or PFM circuit, may be configured to receive signals 122, 161, and 136 and control current 123 to regulate the output voltage (Vo) to the desired value. Circuit 140 may include a clock generation circuit or clock circuit 144 that may be configured to form one or more clock signals to assist in the operation of circuit 130. An embodiment of circuit 140 may also include a reference generation circuit or Ref circuit 137, an error amplifier circuit or amplifier 139, a comparator 141, and a switching control latch 142. Circuit 130 may also include a logic and/or control circuit 145 that may assist in forming clock or timing signals to assist in the operation of circuit 135 and/or circuit 140.

Figure 2:
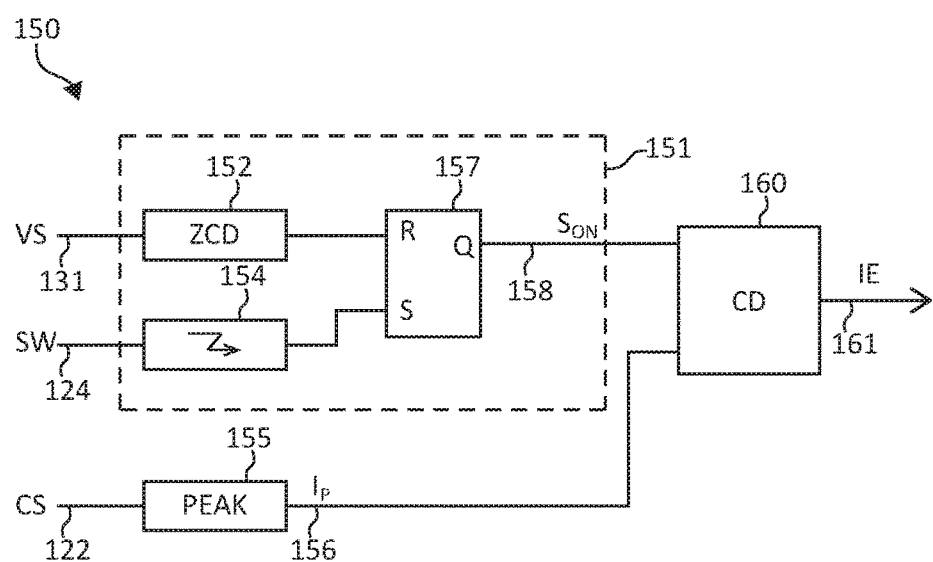
FIG. 2 schematically illustrates a portion of an example of an embodiment of a current predicting circuit that may be an alternate embodiment of a circuit of the system of FIG. 1 in accordance with the present invention.

FIG. 2 schematically illustrates a portion of an example of an embodiment of a current predicting circuit 150 that may be an alternate embodiment of circuit 134 (FIG. 1). Circuit 150 may have an embodiment that may include a timing detection circuit 151, a current estimator (CE) circuit 160, and a peak detection circuit 155. Circuit 155 may be configured to receive current sense (CS) signal 122, or a signal that is representative of current sense signal 122, and form a peak (Ip) signal 156 that is representative of the peak value of current 123 that occurs during an on-time of transistor 120, or alternately that occurs during an asserted time of signal 124.

Circuit 151 may have an embodiment that may be configured to form a timing signal (Son) 158 that is representative of at least a portion of a time interval that the secondary winding (NS) is supplying current to secondary side 104 or alternately that a secondary current is flowing in the secondary winding during a period of signal 124. For example, circuit 151 may be configured to assert signal 158 during a time interval that secondary current is flowing in the secondary winding. An embodiment of circuit 151 may include a zero crossing detector circuit 152, an edge detector circuit 154, and a latch 157. Circuit 160 may have an embodiment that may be configured to receive signals 156 and 158 and to form estimated current signal 161 having a value that is representative of the average value of the secondary current that flows in the secondary winding, for example the average value of the secondary current averaged over a period of signal 124.

Figure 3:
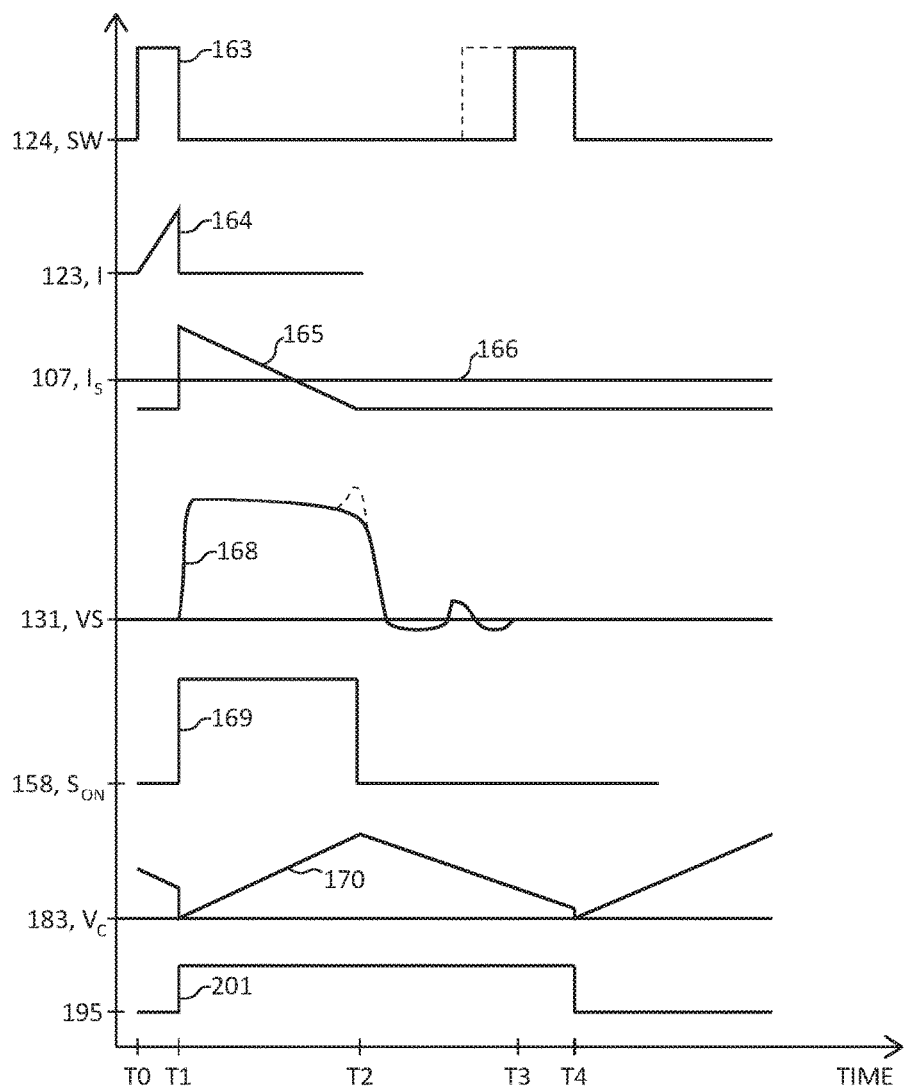
FIG. 3 is a graph having plots that illustrate some signals that may occur during an example of an operation of an embodiment of a circuit of the system of FIG. 1 or the circuit of FIG. 2 in accordance with the present invention.

FIG. 3 is a graph having plots that illustrate in a general manner examples of some signals that may occur during an example of an operation of an embodiment of circuit 150 or circuit 130 or alternately system 100. The abscissa indicates time and the ordinate indicates increasing value of the illustrated signal. A plot 163 illustrates an example of signal 124 during a period (T) or cycle of transistor 120 or alternately of signal 124. A plot 164 illustrates current 123, a plot 165 illustrates an example of the secondary current supplied by the secondary winding during a period of signal 124, a plot 166 illustrates an example of the average value of the secondary current supplied by the secondary winding during a period of signal 124, a plot 168 illustrates an example of signal 131, a plot 169 illustrates an example of signal 158, a plot 170 illustrates a control signal 183 that will be explained further hereinafter, and a plot 201 illustrates a signal 195 that will be explained further hereinafter. This description has references to FIGS. 1-3.

For this example, assume that at a time T0 signal 124 is asserted or already asserted thereby enabling transistor 120, and current 123 is flowing through the primary winding and transistor 120, thus, storing energy in transformer 108 as illustrated by plot 164. The AX signal and signal 131 are substantially zero as illustrated by plot 168. Additionally, transistor 105 is disabled. At a time T1, transistor 120 is disabled which terminates the primary current as illustrated by plot 164. Disabling transistor 120 also causes a transfer of energy into the secondary winding and auxiliary winding of transformer 108. Current begins to flow in the secondary winding as illustrated by plot 165 and the secondary on-time of plot 169. Additionally, disabling transistor 120 also causes signal 131 to increase as illustrated by plot 168. Circuit 154 (FIG. 2) detects the asserted to negated transition of signal 124 and forms a pulse to set latch 157 thereby asserting signal 158 as illustrate by plot 169. Circuit 160 receives the asserted signal 158 and signal 156 and forms signal 161 that is representative of the peak value of current 123 and that is formed over a time interval that is representative of the time interval that current is flowing through the secondary winding.

Assume that at a time T2 current 107 may become substantially zero as illustrated by plot 165 which causes the value of the voltage across the secondary winding, and across the AX winding, to decrease as illustrated by plot 168 changing value and beginning to decrease. Additionally signal 131 begins to decrease as illustrated by plot 168. In an embodiment, the decrease of signal 131 indicates that the secondary current has become substantially zero. Circuit 152 detects the substantially zero crossing of the secondary current, or alternately detects the decrease in the value of signal 131, and forms a signal to reset latch 157 and negate signal 158 as illustrated by plot 169. Thus, in an embodiment the asserted time interval of signal 158 may be representative of the time interval that secondary current is flowing in the secondary winding.

Those skilled in the art will appreciate that plot 168 is a simplified representation of signal 131 and that in some embodiments signal 131 may increase in value just prior to or substantially simultaneously with the secondary current becoming substantially zero, as illustrated by dashed lines, and that circuit 152 may be configured to detect the substantially zero crossing of the secondary current even under such conditions.

In order to facilitate the herein before described functionality, and input of circuit 152 is connected to receive signal 131 and an output is connected to a reset input of latch 157. An input of circuit 154 is connected to receive signal 124 and an output is connected to a set input of latch 157. A Q output of latch 157 is connected to a first input of circuit 160. An input of circuit 155 is connected to receive signal 122 and an output is connected to a second input of circuit 160. An output of circuit 160 is configured to form signal 161.

Figure 4:
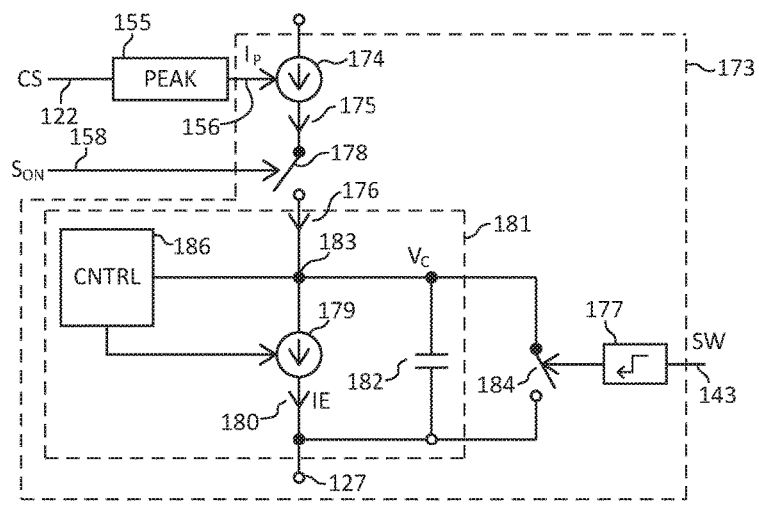
FIG. 4 schematically illustrates an example of a portion of an embodiment of a current estimating circuit that may be an alternate embodiment of at least a portion of the circuit of FIG. 2 in accordance with the present invention.

FIG. 4 schematically illustrates a portion of an example of an embodiment of a current estimator circuit 173 that may be an alternate embodiment of at least a portion of circuit 150 (FIG. 2). As will be seen further hereinafter, an embodiment of circuit 173 may be configured to form a first signal, such as a current signal 176 for example, that may be representative of the peak value of current 123 through transistor 120 and may have a duration that is representative of a time interval that secondary current is flowing through the secondary winding. The peak value is the peak value that is formed during an on-time of transistor 120. Circuit 173 may also have an embodiment that may be configured to form a current, such as a current signal 180. An embodiment of signal 180 may have a value that is representative of an average value of the secondary current supplied by the secondary winding, such as for example the average value supplied during a period of signal 124.

Circuit 173 may have an embodiment that includes a variable current source 174, a switch 178, a switch 184, a pulse generating circuit 177, and an averaging circuit 181. Averaging circuit 181 may have an embodiment that includes another variable current source 179, a capacitor 182, and a control circuit 186. Source 174 may have an embodiment that is configured to receive signal 156 and form a current 175 that is representative of the peak value of current 123 (FIG. 1). Switch 178 may have an embodiment configured to receive signal 158 as a control signal and to couple current 175 to node 183, or alternately to capacitor 182, in response to the asserted state of signal 158. Thus, circuit 173 may be configured to form current signal 176 having a value that is representative of the peak value of current 123 and a duration that is substantially equal to the time interval that current is flowing the in secondary winding during a period of signal 124. An embodiment of signal 176 may be substantially equal to the value of the secondary current that flows in the secondary winding during a period of signal 124. Averaging circuit 181 is configured to receive signal 176 and form a signal 180 that is substantially equal to the average value of the secondary current supplied by the secondary winding during a time interval that is substantially equal to a period of signal 124.

Referring to FIG. 3 and FIG. 4, at time T1, signal 124 is negated. Circuit 177 detects the negated state and forms a short narrow pulse that briefly enables or closes switch 184 to discharge capacitor 182 as is illustrated by plot 170 at time T1. Also at time T1, signal 158 is asserted which enables or closes switch 178 thereby coupling current 175 to capacitor 182. As illustrated by plot 170, current 175 charges capacitor 182. At time T2, signal 158 is negated which opens or disables switch 178 thereby removing current 175 from capacitor 182. Consequently, it can be seen that circuit 173 forms signal 176 to have a value that is substantially equal to the peak value of current 123 and forms signal 176 for a duration or time interval that is substantially equal to the time interval that the secondary winding supplies current to secondary side 104. During the remainder of the period of signal 124, switch 178 remains open and signal 180 discharges capacitor 182. As is illustrated by plot 170, voltage Vc begins to decrease as a result of signal 180 discharging capacitor 182.

Control circuit 186 receives the voltage (Vc) formed on capacitor 182 and controls the value of signal 180 to form the peak value of voltage Vc is be substantially constant from one period of signal 124 to the next period of signal 124. In an embodiment, during steady-state operation of circuit 130, the value of signal 180 is sufficient to discharge capacitor 182, during a period of signal 124, by an amount that is substantially equal to the amount of charge stored on capacitor 182 by signal 176. Thus, signal 180 is substantially equal to the average value of the secondary current.

In order to facilitate this operation, a control input of source 174 is configured to receive signal 156, a first terminal of source 174 is connected to receive a power supply voltage, and a second terminal of source 174 is commonly connected to a first terminal of switch 178 and to supply current 175. A control terminal of switch 178 is connected to receive signal 158, and a second terminal of switch 178 is commonly connected to node 183, a first terminal of capacitor 182, a first terminal of switch 184, to a first terminal of source 179, and to an input of circuit 186. An output of circuit 186 is connected to a control input of source 179. A second terminal of source 189 is commonly connected to supply signal 180, to return 127, to a second terminal of capacitor 182, and to a second terminal of switch 184. An input of circuit 177 is connected to receive signal 143 and an output of circuit 177 is connected to a control input of switch 184.

Figure 5:
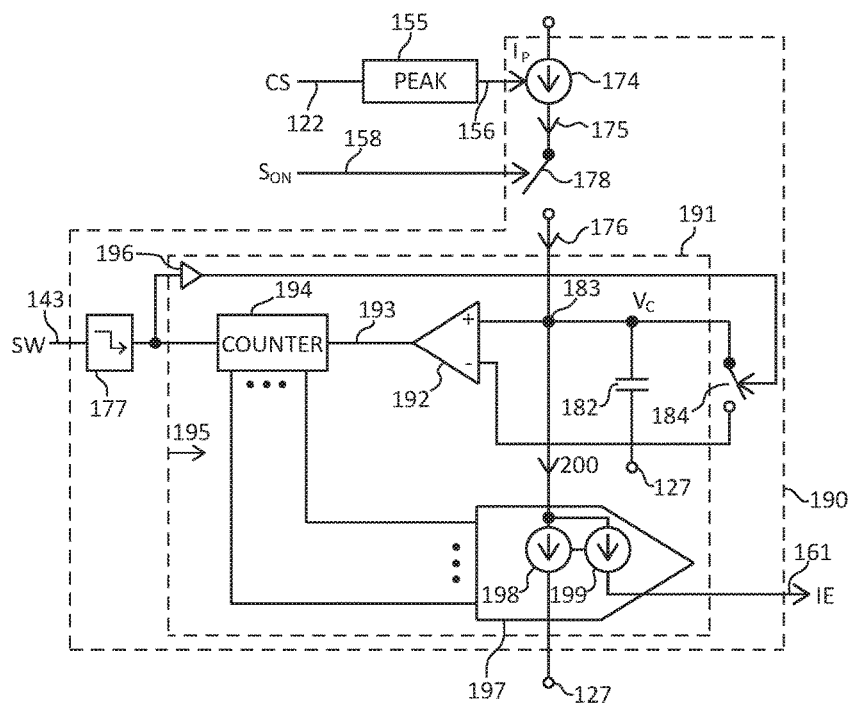
FIG. 5 schematically illustrates an example of a portion of an embodiment of another current estimating circuit that may be an alternate embodiment of at least a portion of the circuit of FIG. 2 or FIG. 3 in accordance with the present invention.

FIG. 5 schematically illustrates an example of a portion of an embodiment of a current estimator circuit 190 that may be an alternate embodiment of either of circuits 160 or 173. Circuit 190 may have an embodiment that may include an averaging circuit 191 in addition to source 174, switch 178, and switch 184. Circuit 191 may have an embodiment that may be an alternate embodiment of circuit 181 (FIG. 4). Circuit 191 may include capacitor 182, pulse generating circuit 177, a comparator 192, a counter 194, a current sensing analog-to-digital controller (CSADC) 197, and a delay circuit 196. An embodiment of circuit 190 may be configured to store a value that is representative of the value of the secondary current during a period of signal 124, or alternately to store a value that is representative of the peak value of voltage Vc.

Counter 194 is configured to count once during each period of signal 124. In an embodiment, counter 194 counts once for each negative transition of signal 124. In other embodiments, counter may be configured to count at other points of the period of signal 124, for example at the positive transition of signal 124 instead of the negative transition. Comparator 192 compares voltage Vc to a reference voltage and forms a counter control signal 193 on the output of comparator 192. The state of signal 193 is used to control the direction in which counter 194 counts. For example, if signal 193 is asserted counter 194 increments and if signal 193 is negated counter 194 decrements. The digital output of counter 194 is received by CSADC 197. CSADC forms a current 200 through a current source 198 that has a value that is substantially equal to the value of the digital signal received from counter 194. CSADC 197 may have an embodiment wherein current source 198 is formed to include a current mirror having a mirror circuit 199 that forms signal 161 proportional to the value of current 200. The proportionality is established by the ratio of the sizes of the transistors used in the current mirror of sources 198 and 199.

Referring again to FIG. 3, assume that system 100, thus, circuit 130, is operating in a substantially steady-state condition so that the current supplied by the secondary winding is substantially constant from one period of signal 124 to the next. At time T1, signal 124 is negated. Circuit 177 detects the negated state and forms a short narrow pulse. Counter 194 receives the pulse formed by circuit 177 and counts in a direction as controlled by signal 193 as illustrated by plot 201. Assume for example that signal 193 is asserted, thus counter 194 increments. CSADC 197 receives the digital word from counter 194 and increases (or alternately decreasing) the value of current 200, thus also increasing (or alternately decreasing) signal 161 formed by source 199. Also at time T1, signal 158 is asserted which enables or closes switch 178 thereby coupling current 175 to capacitor 182. As illustrated by plot 170, signal 176 charges capacitor 182. Circuit 196 delays the output of circuit 177, thus, the signal from circuit 196 briefly closes switch 184 to discharge capacitor 182 as is illustrated by plot 170 at time T1. It should be noted that plot 170 is slightly delayed from plots 163, 169, and 201 by the delay time of circuit 177, although such delay is not illustrated in FIG. 3 due to the compressed time scale and for clarity of the illustrations. Capacitor 182 is integrating current signal 176, thus storing charge on capacitor 182 that is representative of the value of the secondary current, while current 200 is discharging capacitor 182 in order to maintain the peak value of voltage Vc substantially constant from one period of signal 124 to the next, during steady-state operation of circuit 130.

At time T2 signal 158 is negated which opens on disables switch 178 thereby removing current 175 from capacitor 182. Consequently, it can be seen that circuit 190 forms signal 176 to have a value that is substantially equal to the peak value of current 120 and forms signal 176 for a duration or time interval that is substantially equal to the time interval that the secondary winding supplies current to secondary side 104. As is illustrated by plot 170, voltage Vc begins to decrease as a result of signal 180 discharging capacitor 182. During the remainder of the period of signal 124, switch 178 remains open and current 200 discharges capacitor 182 such that the peak value of voltage Vc is substantially constant to the peak value from a previous period during steady-state operation of system 100. Subsequently, signal 124 will again be asserted as is illustrated at a time T3, however, as illustrated by the dashed portions of signal 124, the amount of time that signal 169 is asserted, thus, the beginning of the next assertion of signal 124, is variable, thus the exact beginning of signal 124 relative to the negating of signal 158 is not known.

At a time T4, another period of signal 124 begins. For the example of system 100, and circuit 130, operating in a steady-state condition, control signal 193 will be in the opposite state for the cycle that begins at T4. Thus, the count of counter 194 will be decreased for this cycle so that the peak value of voltage Vc remains substantially constant from the cycle that begins at T4 to the cycle that began it T1. It will be noted by those skilled in the art that during steady state operation, the count of counter 194 will alternate between two adjacent values, thus, the value of current 200 will alternate between two values. However, the amount of change in the value of voltage Vc, and of signal 161, is very small so that signal 161 remains substantially representative of the average value of the secondary current. Those skilled in the art will also appreciate that for non-steady-state operation the count of counter 194 may be changed in the same direction for several periods in succession in order to eventually reach an equilibrium point wherein the value of voltage Vc becomes a value that can be substantially constant from one period to the next period of signal 124.

In order to facilitate the herein before described functionality, a non-inverting input of comparator 192 is connected to node 183, and an inverting input is connected to return 127. An output of comparator 192 is connected to a control input of counter 194. A clock input of counter 194 is commonly connected to an output of circuit 177, and to an input of circuit 196. The digital output of counter 194 is connected to an input of CSADC 197. A source input of CSADC 197 is connected to node 183. An output of CSADC 197 is connected to supply signal 161. An output of circuit 196 is connected to the control input of switch 184.

Figure 6:
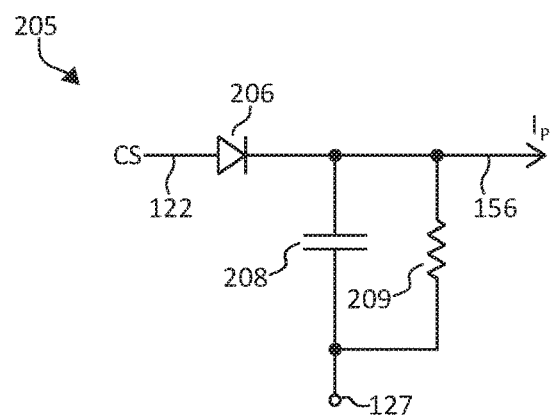
FIG. 6 schematically illustrates a portion of an example of an embodiment of a peak detection circuit that may be an alternate embodiment of at least a portion of the circuit of FIG. 2 or 4-5 in accordance with the present invention.

FIG. 6 schematically illustrates an example of a portion of an embodiment of a peak detection circuit 205 that may be an alternate embodiment of circuit 155 explained in the description of FIG. 2. Circuit 205 includes a diode 206, a capacitor 208, and a resistor 209. Diode 206 receives signal 122 and charges capacitor 208 to a voltage that is representative of substantially the peak value of current 123 during a time interval that switch 120 is enabled during a period of signal 124. For each period of signal 124, the voltage on capacitor 208 is adjusted be substantially equal to the peak value of current 123 for that period. Thus, signal 156 is representative of the peak value of current 123. An embodiment of circuit 205 may include that the time constant formed by capacitor 208 and resistor 209 is much larger than the time constant of the frequency of signal 124.

To facilitate this operation, and anode of diode 206 is connected to receive signal 122 and a cathode is commonly connected to a first terminal of capacitor 208 and a first terminal of resistor 209 and to supply signal 156. A second terminal of capacitor 208 is commonly connected to a second terminal of resistor 209 and to return 127.

Figure 7:
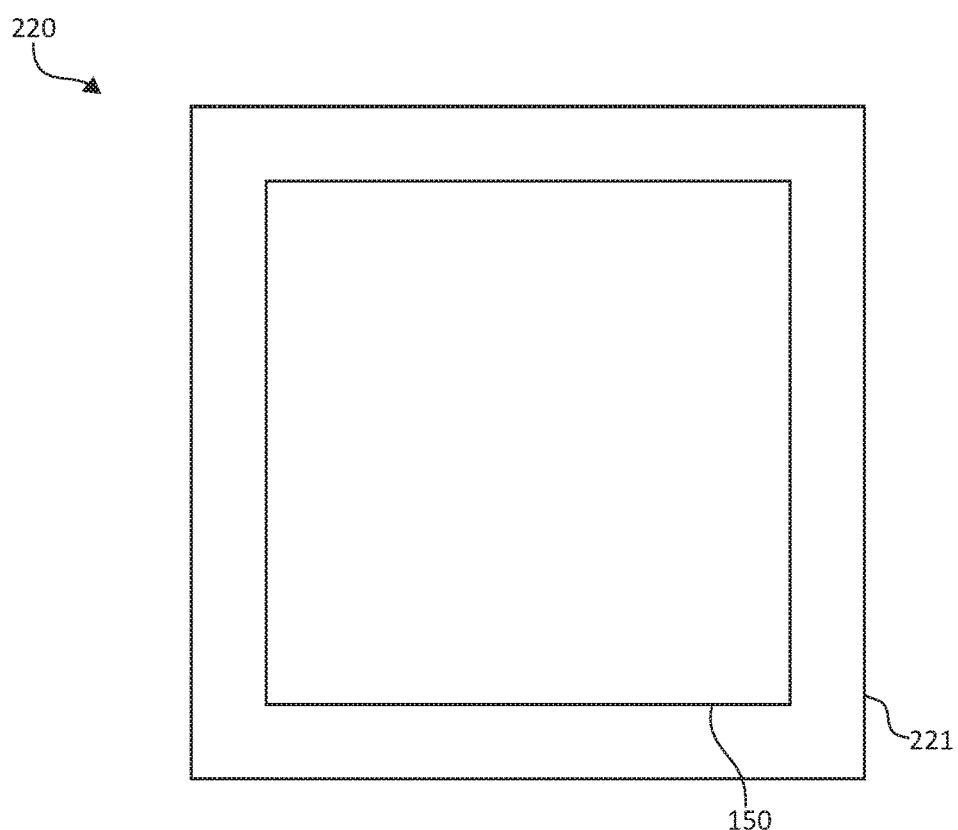
FIG. 7 illustrates an enlarged plan view of a semiconductor device that includes one or more of the circuits of FIGS. 1 or 3-6 in accordance with the present invention.

FIG. 7 illustrates an enlarged plan view of a portion of an embodiment of a semiconductor device or integrated circuit 220 that is formed on a semiconductor die 221. In an embodiment, any one of circuits 130, 134, 150, 173, or 190 may be formed on die 221. Die 221 may also include other circuits that are not shown in FIG. 7 for simplicity of the drawing. The circuits or integrated circuit 220 may be formed on die 221 by semiconductor manufacturing techniques that are well known to those skilled in the art.

From all the foregoing, one skilled in the art will understand that an embodiment of a power supply controller may comprise:

a PWM circuit, such as for example circuit 140, configured to control a power switch, such as for transistor 120, to control a primary current, such as for example current 123, through a primary inductor of a transformer to regulate an output voltage, such as for example voltage Vo, formed from a secondary winding of the transformer wherein the secondary winding is configured to be coupled to a synchronous rectifier, such as for example transistor 105, the PWM circuit configured to enable the power switch at a frequency having a period;

a first circuit, such as for example circuit 133, configured to form a sense signal, such as for example signal 131, that is representative of an auxiliary voltage from an auxiliary winding of the transformer wherein the sense signal is representative of a value of the output voltage for at least a portion of an off-time of the power switch;

a current circuit, such as for example circuit 174, configured to form a first current, such as for example current 175, that is representative of a peak value of the primary current that flows through the power switch during an on-time of the power switch during the period;

a timing detection circuit, such as for example circuit 151, configured to form a timing signal, such as for example signal 158, that is representative of at least a portion of a time interval, such as for example interval illustrated by plot 168, that a secondary current is flowing in the secondary winding during the period; and a current estimator circuit, such as for example one of circuits 160, 173, or 190, configured charge a capacitor, such as for example capacitor 182, with the first current for the time interval, the current estimator circuit configured to form a second current, such as for example one of currents 180 or 200, to discharge the capacitor during the period and to form an estimated current that is representative of the second current wherein the estimated current is representative of an average value of the secondary current during the period.

Another embodiment of the power supply controller may include a first variable current source, such as for example source 174, configured to form the first current; and wherein the current estimator circuit includes a first switch, such as for example transistor 178, configured to couple the first current to the capacitor for the time interval, and a second current source, such as for example source 179, configured to discharge the capacitor during the period.

Another embodiment may include a control circuit, such as for example circuit 186, that may be configured to adjust a value of the second current to maintain a peak value of a voltage on the capacitor to be substantially constant from one period to another period.

An embodiment may also include a comparator configured to compare a voltage on the capacitor to a reference voltage, a counter configured to increment a count of the counter in response to the voltage on the capacitor having a value greater than the reference voltage in response to disabling the power switch or to decrement the count of the counter in response to the voltage on the capacitor having a value no greater than the reference voltage in response to disabling the power switch, wherein the count of the counter adjusts a value of the second current.

Another embodiment may include a current sinking DAC, such as for example circuit 197, configured to receive the count of the counter and form the second current responsively to the count of the counter.

An embodiment may also include a zero crossing detection circuit, such as for example circuit 152, configured to detect a substantially zero crossing of the secondary current and responsively negate the timing signal.

In another embodiment, the timing detection circuit may be configured to assert the timing signal in response to disabling the power switch.

An embodiment may also include a peak detection circuit (155) configured to form a peak signal, such as for example circuit 156, that is representative of the peak value of the primary current, and wherein the current circuit includes a variable current source configured to form a value of the first current responsively to a value of the peak signal.

Another embodiment may include a comparator configured to control counting of a counter responsively to a value of a voltage on the capacitor.

Those skilled in the art will also appreciate that an embodiment of an example of a semiconductor device having a power supply controller may comprise:

a PWM circuit, such as for example circuit 140, configured to control a power switch, such as for example transistor 120, to control a primary current, such as for example current 123, through a primary inductor of a transformer to regulate an output voltage, such as for example voltage Vo, formed from a secondary winding of the transformer, the PWM circuit configured to enable the power switch at a frequency having a period;

a first circuit configured to form a sense signal, such as for example signal 131, that is representative of a value of the output voltage for at least a portion of an off-time of the power switch;

a current circuit, such as for example circuit 174, configured to form a first current, such as for example current 175 that is representative of a peak value of a current, such as for example current 123, that flows through the power switch during an on-time of the power switch;

a timing detection circuit, such as for example circuit 151, configured to form a timing signal, such as for example signal 158, that is representative of a time interval that a secondary current is flowing in the secondary winding; and a current estimator circuit, such as for example circuit 160, configured receive the timing signal and the first current, and to form an estimated current signal, such as for example signal 161, having a value that is representative of a result of integrating the first current for the time interval.

In an embodiment, the timing detection circuit may be configured to assert the timing signal in response to initiation of the secondary current and to negate the timing signal in response to detecting the secondary current becoming substantially zero.

Another embodiment may include a zero crossing detection circuit configured to detect the secondary current becoming substantially zero.

An embodiment may also include a zero crossing detection circuit configured to detect a change in the value of the sense signal subsequently to an increase in the sense signal that occurs responsively to disabling the power switch.

Another embodiment may include a first circuit configured to form a second current signal, such as for example current 176, during the time interval wherein a value of the second current signal is representative of the peak value of the primary current.

An embodiment may include a variable current source configured to form a second current, such as for example current 175, having a value that is representative of the peak value of the primary current.

Another embodiment may include a switch configured to couple the second current having a value that is representative of the peak value of the primary current to a capacitor for the time interval.

Those skilled in the art will appreciate that a method of forming a semiconductor device may comprise:

forming a PWM circuit, such as for example circuit 140, of the semiconductor device to control a power switch, such as for example transistor 120, to control a primary current, such as for example current 123, through a primary inductor of a transformer to regulate an output voltage, such as for example voltage Vo, formed from a secondary current that is formed by a secondary winding of the transformer, the PWM circuit configured to enable the power switch at a frequency having a period;

configuring the PWM circuit to form a first signal, such as for example signal 183, having a value formed to be representative of a peak value of a primary current through the power switch and having a duration that is representative of a time interval that a secondary current is flowing through the secondary winding wherein the peak value is the peak value during an on-time of the power switch; and configuring the PWM circuit to form a current, such as for example signal 161, having a value that is representative of an average value of the secondary current.

In an embodiment, the method also may include configuring a peak circuit to form a peak signal, such as for example signal 156, that is representative of the peak value of the primary current; and configuring a current estimator circuit, such as for example anyone of circuits 160, 173, 190, to couple the first signal to a node for the time interval.

Another embodiment may include configuring a timing detection circuit, such as for example circuit 151, to form a timing signal that is representative of a time interval that the secondary current is flowing in the secondary winding.

An embodiment may include configuring a current estimator circuit, such as for example circuit 160, to receive the first signal and integrate the first signal over the time interval.

Another embodiment may include configuring a current estimator circuit, such as for example circuit 160, to charge a capacitor with the first signal over the time interval and to discharge the capacitor for another portion of a period of the power switch.

In view of all of the above, it is evident that a novel device and method is disclosed. Included, among other features, is forming a circuit to form a signal that is representative of the value of the secondary current without using an optical coupler or a circuit in the secondary that senses the value of the secondary current.

While the subject matter of the descriptions are described with specific preferred embodiments and example embodiments, the foregoing drawings and descriptions thereof depict only typical and non-limiting examples of embodiments of the subject matter and are not therefore to be considered to be limiting of its scope, it is evident that many alternatives and variations will be apparent to those skilled in the art. As will be appreciated by those skilled in the art, the example form of circuits 173 and 190 are used as a vehicle to explain the operation method of a circuit or method to determine the value of the secondary current or alternately an average value of the secondary current. The circuits may have other configurations as long as they form such signals.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A power supply controller comprising:
    a PWM circuit configured to control a power switch to control a primary current through a primary inductor of a transformer to regulate an output voltage formed from a secondary winding of the transformer wherein the secondary winding is configured to be coupled to a synchronous rectifier, the PWM circuit configured to enable the power switch at a frequency having a period;
    a first circuit configured to form a sense signal that is representative of an auxiliary voltage from an auxiliary winding of the transformer wherein the sense signal is representative of a value of the output voltage for at least a portion of an off-time of the power switch;
    a current circuit configured to form a first current that is representative of a peak value of the primary current that flows through the power switch during an on-time of the power switch during the period;
    a timing detection circuit configured to form a timing signal that is representative of at least a portion of a time interval that a secondary current is flowing in the secondary winding during the period; and
    a current estimator circuit configured charge a capacitor with the first current for the time interval, the current estimator circuit configured to form a second current to discharge the capacitor during the period and to form an estimated current that is representative of the second current wherein the estimated current is representative of an average value of the secondary current during the period, the current estimator circuit including a comparator configured to compare a voltage on the capacitor to a reference voltage, a counter configured to increment a count of the counter in response to the voltage on the capacitor having a value greater than the reference voltage in response to disabling the power switch or to decrement the count of the counter in response to the voltage on the capacitor having a value no greater than the reference voltage in response to disabling the power switch, wherein the count of the counter adjusts a value of the second current.

2. The power supply controller of claim 1 wherein the current estimator circuit includes a current sinking DAC configured to receive the count of the counter and form the second current responsively to the count of the counter.

3. The power supply controller of claim 1 wherein the timing detection circuit includes a zero crossing detection circuit configured to detect a substantially zero crossing of the secondary current and responsively negate the timing signal.

4. The power supply controller of claim 3 wherein the timing detection circuit is configured to assert the timing signal in response to disabling the power switch.

5. The power supply controller of claim 1 further including a peak detection circuit configured to form a peak signal that is representative of the peak value of the primary current, and wherein the current circuit includes a variable current source configured to form a value of the first current responsively to a value of the peak signal.

6. The power supply controller of claim 5 further including the comparator configured to control counting of the counter responsively to a value of a voltage on the capacitor.

7. A power supply controller comprising:
    a PWM circuit configured to control a power switch to control a primary current through a primary inductor of a transformer to regulate an output voltage formed from a secondary winding of the transformer wherein the secondary winding is configured to be coupled to a synchronous rectifier, the PWM circuit configured to enable the power switch at a frequency having a period;
    a first circuit configured to form a sense signal that is representative of an auxiliary voltage from an auxiliary winding of the transformer wherein the sense signal is representative of a value of the output voltage for at least a portion of an off-time of the power switch;
    a current circuit configured to form a first current that is representative of a peak value of the primary current that flows through the power switch during an on-time of the power switch wherein the current circuit includes a first variable current source configured to form the first current;
    a timing detection circuit configured to form a timing signal that is representative of at least a portion of a time interval that a secondary current is flowing in the secondary winding during the period; and
    a current estimator circuit configured charge a capacitor with the first current for the time interval, the current estimator circuit configured to form a second current to discharge the capacitor during the period and to form an estimated current that is representative of the second current wherein the estimated current is representative of an average value of the secondary current during the period, the current estimator circuit including a first switch configured to couple the first current to the capacitor for the time interval, and a second current source configured to discharge the capacitor during the period and wherein the current estimator circuit includes a control circuit configured to adjust a value of the second current to maintain a peak value of a voltage on the capacitor to be substantially constant from one period to another period.

8. A semiconductor device having a power supply controller comprising:
    a PWM circuit configured to control a power switch to control a primary current through a primary inductor of a transformer to regulate an output voltage formed from a secondary winding of the transformer, the PWM circuit configured to enable the power switch at a frequency having a period;

a first circuit configured to form a sense signal that is representative of a value of the output voltage for at least a portion of an off-time of the power switch;

a current circuit configured to form a first current that is representative of a peak value of a current that flows through the power switch during an on-time of the power switch;

a timing detection circuit configured to form a timing signal that is representative of a time interval that a secondary current is flowing in the secondary winding; and a current estimator circuit configured to receive the timing signal and the first current, and to form an estimated current signal having a value that is representative of a result of integrating the first current for the time interval, the current estimator circuit configured to charge a capacitor with the first current during the first time interval and to reset the capacitor in response to disabling the power switch.

9. The power supply controller of claim 8 wherein the timing detection circuit is configured to assert the timing signal in response to initiation of the secondary current and to negate the timing signal in response to detecting the secondary current becoming substantially zero.

10. The power supply controller of claim 9 wherein the timing detection circuit includes a zero crossing detection circuit configured to detect the secondary current becoming substantially zero.

11. The power supply controller of claim 9 wherein the timing detection circuit includes a zero crossing detection circuit configured to detect a change in the value of the sense signal subsequently to an increase in the sense signal that occurs responsively to disabling the power switch.

12. The power supply controller of claim 8 wherein the current estimator circuit includes a second circuit configured to form a second current signal during the time interval wherein a value of the second current signal is representative of the peak value of the primary current.

13. The power supply controller of claim 12 wherein the first circuit includes a variable current source configured to form a second current having a value that is representative of the peak value of the primary current, wherein the first circuit includes a switch configured to couple the second current having a value that is representative of the peak value of the primary current to a capacitor for the time interval.

14. A method of forming a semiconductor device comprising:

forming a PWM circuit of the semiconductor device to control a power switch to control a primary current through a primary inductor of a transformer to regulate an output voltage formed from a secondary current that is formed by a secondary winding of the transformer, the PWM circuit configured to enable the power switch at a frequency having a period;

configuring the PWM circuit to form a first signal having a value formed to be representative of a peak value of a primary current through the power switch and having a duration that is representative of a time interval that a secondary current is flowing through the secondary winding wherein the peak value is the peak value during an on-time of the power switch;

configuring the PWM circuit to form a current having a value that is representative of an average value of the secondary current;

configuring a peak detection circuit to form a peak signal that is representative of the peak value of the primary current; and configuring a current circuit to include a variable current source configured to form a value of the first signal responsively to a value of the peak signal and a comparator configured to control counting of a counter responsively to a value of a voltage on the capacitor.

15. The method of claim 14 wherein configuring the PWM circuit to form the first signal that is representative of the peak value of the primary current includes configuring a peak circuit to form a peak signal that is representative of the peak value of the primary current; and configuring a current estimator circuit to couple the first signal to a node for the time interval.

16. The method of claim 14 wherein configuring the PWM circuit to form the first signal that is representative of the peak value of the primary current includes configuring a timing detection circuit to form a timing signal that is representative of a time interval that the secondary current is flowing in the secondary winding.

17. The method of claim 14 wherein configuring the PWM circuit to form the first signal that is representative of the peak value of the primary current includes configuring a current estimator circuit to receive the first signal and integrate the first signal over the time interval.

18. The method of claim 14 wherein configuring the PWM circuit to form the first signal that is representative of the peak value of the primary current includes configuring a current estimator circuit to charge a capacitor with the first signal over the time interval and to discharge the capacitor for another portion of a period of the power switch.

* * * * *

UNITED STATES PATENT AND TRADEMARK OFFICE
CERTIFICATE OF CORRECTION

PATENT NO.        : 10,038,385 B2  
APPLICATION NO.   : 15/471666  
DATED             : July 31, 2018  
INVENTOR(S)       : Lei Chen et al.

Page 1 of 1

It is certified that error appears in the above-identified patent and that said Letters Patent is hereby corrected as shown below:

In Item (54), delete "FLYBACK CONVERTER AND CONTROLLER USING COUNTER AND CURRENT EMULATOR" and replace with --POWER SUPPLY CONTROLLER AND SEMICONDUCTOR DEVICE AND METHOD THEREFOR--.

Signed and Sealed this
Eighteenth Day of June, 2019

Andrei Iancu
*Director of the United States Patent and Trademark Office*